(12) United States Patent
Bucknell

(10) Patent No.: US 8,069,664 B2
(45) Date of Patent: Dec. 6, 2011

(54) INTEGRATED INLET AND BYPASS THROTTLE FOR POSITIVE-DISPLACEMENT SUPERCHARGED ENGINES

(75) Inventor: John R Bucknell, Royal Oak, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 714 days.

(21) Appl. No.: 12/212,858

(22) Filed: Sep. 18, 2008

(65) Prior Publication Data
US 2010/0065025 A1    Mar. 18, 2010

(51) Int. Cl.
*F02B 33/00* (2006.01)
*F16K 11/085* (2006.01)

(52) U.S. Cl. .............. 60/611; 137/625.47; 60/605.2; 123/561

(58) Field of Classification Search ............ 123/561, 123/568.19; 60/605.1, 605.2, 611; 137/625.41, 137/625.47
See application file for complete search history.

(56) References Cited

U.S. PATENT DOCUMENTS

| | | | | |
|---|---|---|---|---|
| 1,493,133 | A * | 5/1924 | Sykora | 137/625.47 |
| 4,462,372 | A * | 7/1984 | Jackson | 123/452 |
| 4,800,726 | A * | 1/1989 | Okada et al. | 60/614 |
| 5,335,500 | A * | 8/1994 | Wunderlich et al. | 60/609 |
| 5,791,315 | A * | 8/1998 | Riach et al. | 123/564 |
| 7,347,048 | B2 * | 3/2008 | Albat | 60/624 |

* cited by examiner

*Primary Examiner* — Burton Mullins

(57) ABSTRACT

A supercharged engine has a charge air intake and an engine exhaust outlet, a positive displacement supercharger connected to the air intake, a charge air and bypass control valve comprising a rotary body throttle valve including a rotary valve body, a primary air passage and a separate bypass air passage each extending through the rotary body. The primary air passage is fully open in a first rotary position of the rotary body wherein the bypass air passage is closed, and the bypass air passage is fully open in a second rotary position wherein the primary air passage is closed. Airflow through the passages varies in an inverse manner as the rotary body is rotated between the first and second positions, whereby airflow through the control valve is controlled with a single actuator movable through the full range of positions and airflow through the primary and bypass passages is inversely varied.

12 Claims, 2 Drawing Sheets

INTEGRATED INLET AND BYPASS THROTTLE FOR POSITIVE-DISPLACEMENT SUPERCHARGED ENGINES

TECHNICAL FIELD

This invention relates to internal combustion engines and to an integrated inlet and bypass throttle particularly but not exclusively for positive displacement supercharged engines.

BACKGROUND OF THE INVENTION

It is known in the art relating to inlet throttled supercharged engines to provide two variable flow orifices or throttles to control the load of the engine. Control electronics and calibrations are required for each orifice. Referring to FIG. 1, a typical prior art arrangement is represented by an engine 10 including a cylinder block 11 mounting an intake manifold having an air inlet 12 and an exhaust manifold having an exhaust outlet 13. The engine 11 drives a positive displacement charge compressor or supercharger 14 which delivers charge air through a charge cooler 15 to the inlet 12 of the intake manifold. The supercharger 14 receives charge airflow from a primary inlet throttle 16, typically a blade (or butterfly) type inlet throttle (recently Electronic Throttle Control or ETC). A smaller secondary blade type bypass throttle 17, controlled, for example, by a solenoid with a spring-over-diaphragm actuator, not shown, is connected between the outlet 18 of the charge cooler 15 and the inlet of the supercharger 14. An exhaust gas recirculation (EGR) valve 19 controls exhaust gas flow for emission reduction from the engine 11 exhaust outlet 13 to the charge compressor 14, downstream of the inlet throttle 16.

The bypass function is the inverse of the inlet throttle such that, as the inlet throttle 16 is opening, the bypass throttle 17 is closing. The bypass actuator typically relies on vacuum generated by the inlet throttle 16 to open the bypass throttle 17 and as such is nearly a binary control (either open or closed). As the bypass 17 closes, the pressure ratio across the supercharger rises rapidly with a rapid change in crankshaft torque with no change in inlet throttle area, making hardware and software calibration difficult to achieve a desirable sensitivity to driver pedal position. A simplified and easier to control throttle arrangement is desired.

SUMMARY OF THE INVENTION

The present invention replaces the separately controlled blade throttles of the prior art with a single barrel throttle that is capable of controlling the area of two separate flow paths by means of two apertures in the axial view of the barrel. When fully open, a larger aperture aligns with an inlet duct to the supercharger and is the primary throttle for the engine. The rotary axis of the barrel is approximately coincident with one edge of the aperture such that about 75 degrees of rotation is enough to fully close the inlet duct. A smaller aperture for bypass control is approximately 25 percent of the area of the larger primary aperture due to the lower flow rate requirements of the bypass.

The bypass aperture is profiled such that, as the larger primary aperture is increasingly exposed to the inlet duct, the smaller bypass aperture is decreasingly exposed to the bypass duct. The latter is arranged approximately 90 degrees to the flow direction of the inlet duct viewed from the axis of the barrel. The bypass flow may be completely cut off after approximately 50 percent of the primary throttle area is exposed, allowing the intake manifold boost pressure supplied by the supercharger to be controlled by the primary throttle. The housing containing the barrel must have appropriate sealing measures with the barrel to prevent significant flow around or between the two apertures in the barrel. Additionally, the interface between the housing and the primary aperture could be profiled to allow fine control of minimum flow rate for good idle control with small changes in rotary position of the actuator.

These and other features and advantages of the invention will be more fully understood from the following description of certain specific embodiments of the invention taken together with the accompanying drawings.

DESCRIPTION OF AN EXEMPLARY EMBODIMENT

Figure 1:
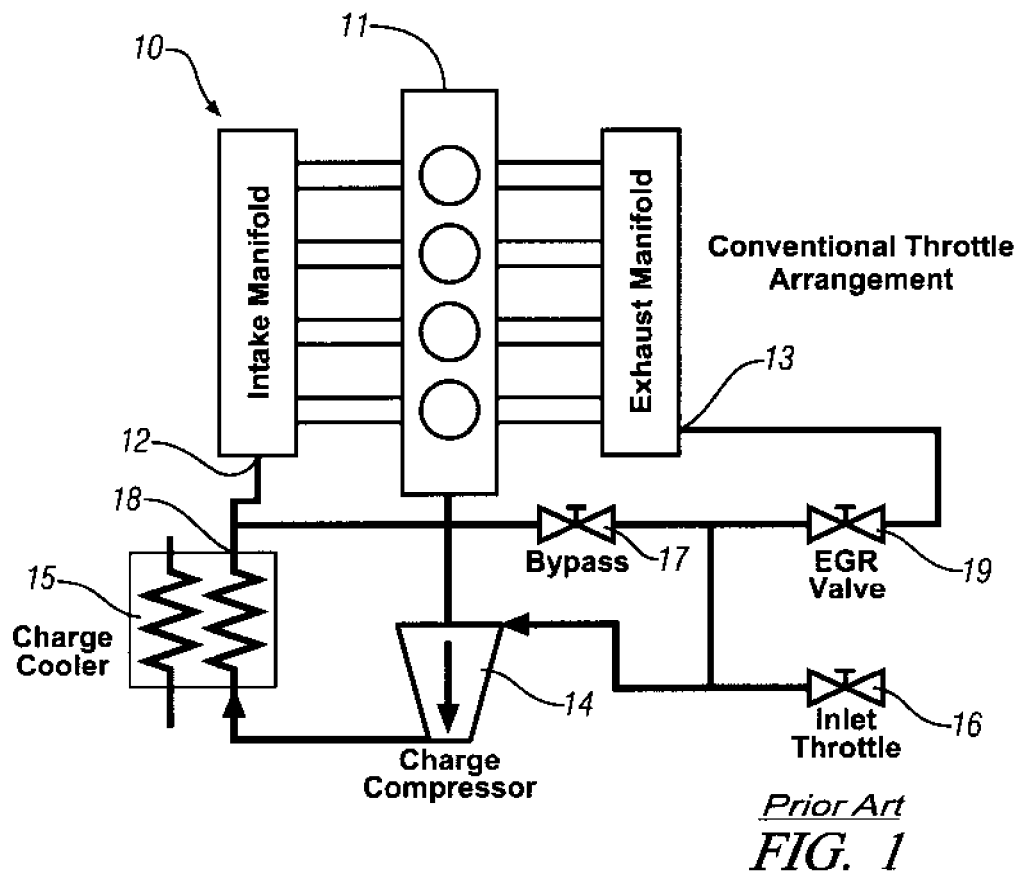
FIG. 1 is a diagrammatic view of an engine provided with a positive displacement supercharger and a prior art bypass throttle control described in the Background of the Invention.
Figure 2:
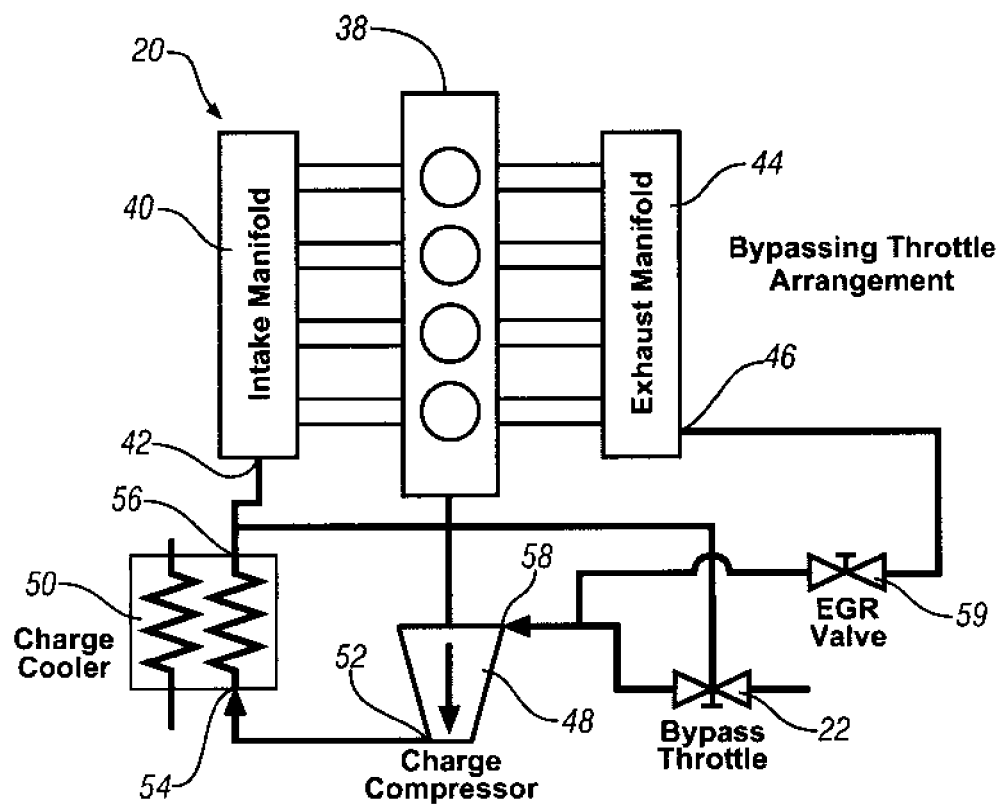
FIG. 2 is a view similar to FIG. 1 showing a similar engine with a bypass throttle control according to the invention.
Figure 3:
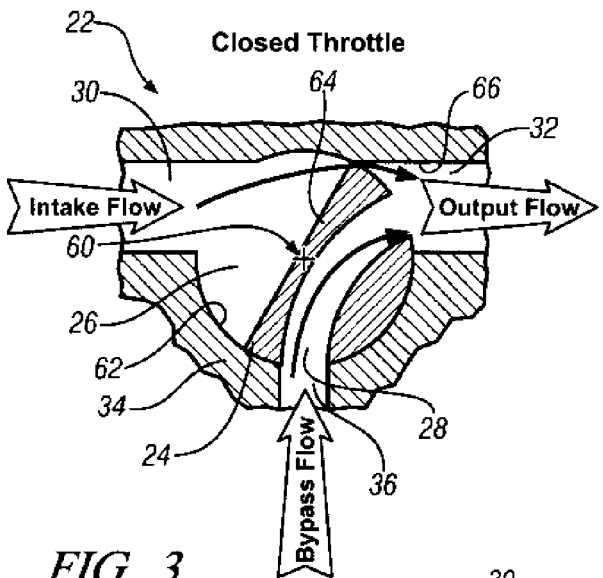
FIGS. 3-5 are diagrammatic views showing closed, part throttle and wide open throttle positions of a barrel primary throttle and secondary bypass flow control valve according to the invention.
Figure 4:
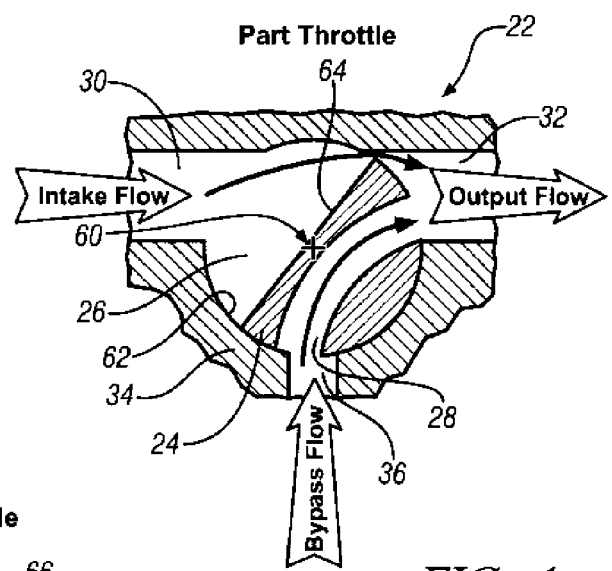
Figure 5:
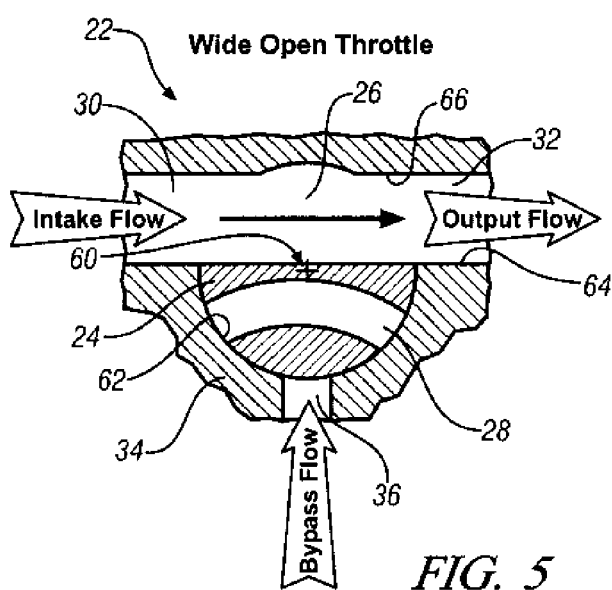

Referring now to FIG. 2 of the drawings in detail, numeral 20 generally indicates a supercharged engine 20 similar to FIG. 1 but having a novel barrel throttle valve 22 combining charge air and bypass airflow control in a single rotary body or barrel 24 having dual apertures or passages for the combined flow control. As shown in FIGS. 3-5 the passages include a primary charge air passage 26 extending laterally across one side of the throttle barrel and forming a large aperture for primary charge airflow. A smaller secondary bypass passage 28 extends laterally through the other side of the throttle barrel. The primary passage 26 in the fully open position extends between laterally aligned inlet and outlet openings 30, 32 in the housing 34 surrounding the throttle barrel. When the barrel is turned about 70 degrees, the secondary bypass passage 28 is fully open, connecting between a bypass flow inlet opening 36 in the valve housing 34 and the outlet opening 32 in the housing. In intermediate positions of the valve, one passage 26, 28 is opening while the other passage is closing.

The bypass aperture or passage 28 is profiled such that, as the larger primary aperture or passage 26 is increasingly exposed to the inlet duct or opening 30, the smaller bypass aperture or passage 28 is decreasingly exposed to the bypass duct or opening 36. The bypass inlet opening 36 is arranged approximately 90 degrees to the flow direction of the inlet opening 30 viewed from the rotary axis 38 of the barrel. The bypass flow may be completely cut off after approximately 50 percent of the primary throttle area is exposed, allowing the intake manifold boost pressure supplied by the supercharger to be controlled by the primary throttle passage 26. The housing 34 containing the barrel 24 must have appropriate sealing measures with the barrel to prevent significant flow around or between the two apertures or passages 26, 28 in the barrel 24. Additionally, the interface between the housing and the primary aperture could be profiled to allow fine control of minimum flow rate for good idle control with small changes in rotary position of the actuator.

Referring again to FIG. 2, as with the prior art engine 10, the engine 20 includes a cylinder block 38 mounting an intake manifold 40 having an air inlet 42 and an exhaust manifold 44 having an exhaust outlet 46. The engine 20 drives a similar positive displacement charge compressor or supercharger 48 which delivers charge air through a charge cooler 50 to the inlet 42 of the intake manifold 40. The supercharger 48 receives charge airflow from the primary inlet throttle, which is the primary passage 26 in the barrel throttle valve 22. As the throttle valve 22 is closed to reduce the inlet airflow, the supercharger 48 begins increasingly to receive bypass airflow from the secondary bypass throttle, which is the bypass passage 28 in the barrel throttle valve 22, until the full bypass flow is reached before the primary inlet throttle 26 is completely closed.

The supercharger 48 has an outlet 52 connected to an inlet 54 of the charge cooler 50 for delivery of both charge air and bypass air to the charge cooler. The cooler 50 has an outlet 56 connected to the inlet 42 of the intake manifold 40 for delivery of cooled charge air to the engine 20 through the intake manifold 40. The charge cooler outlet 56 is also connected with the bypass inlet opening 36 of the valve housing 34 for recirculation of bypass air through bypass passage 28 to the supercharger inlet 58. An EGR valve 59 is also connected from the exhaust manifold outlet 46 to the supercharger inlet 58 downstream of the barrel throttle valve 22.

FIGS. 3-5 diagrammatically illustrate cross-sectional views of the barrel throttle valve 22 showing the rotary throttle barrel 24 with a half circular primary airflow passage 26 and the smaller curved bypass passage 28. The throttle barrel 24 is rotatable about a rotary axis 60 centered within the valve housing 34. The housing 34 encloses a circular recess 62 in which the generally cylindrical throttle barrel is rotatable. In the illustrated embodiment, the primary passage 26 is formed essentially as a slot having a flat bottom 64 passing through the rotary axis 60 and dividing the throttle barrel 24 between the primary and secondary passages 26, 28. A primary inlet airflow opening 30 extends tangentially from the recess 62 on one side of the housing 34 and a common outlet airflow opening 32 extends tangentially in the opposite direction from the recess 62, the openings 30, 32 being axially aligned. A third smaller opening in the housing 34 forms a bypass air inlet opening 36 extending out from the recess 62 at about 90 degrees from the direction of the aligned inlet and outlet openings 30, 32.

The FIGS. 3-5 illustrate three exemplary operating positions for the rotary throttle barrel 24. FIG. 3 shows a closed position of the primary throttle passage 26. The flat bottom 64 of the passage 26, angled upward at about 70 degrees from horizontal in the drawings, intersects a linear outer sidewall 66 of the outlet opening 32 to close the passage to primary airflow indicating that the engine is stopped or decelerating. At the same time, the bypass passage 36 is open to full bypass airflow to carry bypass flow from the supercharger during deceleration.

FIG. 4 illustrates a part throttle position of the throttle barrel 24 wherein the flat bottom 64 is angled upward at about 55 degrees from horizontal, the primary airflow passage 26 is open in a part throttle position and the bypass passage 28 remains fully open, so that the supercharger is idling with a minimum of parasitic loss.

In FIG. 5, the flat bottom 64 lies horizontal with the primary airflow passage 26 is at wide open throttle and the bypass passage is fully closed so that the supercharger is pumping full pressurized flow into the engine 20 to develop full power.

Between the closed and wide open throttle positions the throttle may be positioned at any desired intermediate position to provide non-supercharged cruising or highly supercharged acceleration.

The inverse flow patterns of the primary and bypass passages as the throttle position is varied provide predictable flow relationships at each position of the throttle, allowing a smooth transition between the primary and bypass air flow patterns, reducing the control problems of the prior art arrangements and providing improved performance with a simpler and less costly mechanism.

While the invention has been described by reference to certain preferred embodiments, it should be understood that numerous changes could be made within the spirit and scope of the inventive concepts described. Accordingly, it is intended that the invention not be limited to the disclosed embodiments, but that it have the full scope permitted by the language of the following claims.

The invention claimed is:

1. A supercharged engine comprising:
a charge air intake and an engine exhaust outlet
a positive displacement supercharger having a compressed air outlet connected to the engine charge air intake;
a combined charge air and bypass throttle control valve comprising a rotary body throttle valve including a rotary valve element received in a mating recess of a valve housing, the housing having a throttle air inlet and a throttle air outlet extending in alignment with one side of the housing recess and a bypass air inlet through a side of the housing opposite from said one side;
the rotary body having a charge air passage extending through one side of the body and aligned with the housing throttle air inlet and throttle air outlet in a first rotary position of the body allowing open passage of charge air through the housing air inlet and outlet; and
the rotary body having a bypass passage through a side opposite said one side, the bypass passage communicating the bypass air inlet with the throttle air outlet in a second rotary position of the rotary body in the valve housing wherein the charge air passage is blocked and the bypass passage is fully open;
the rotary body having intermediate positions between the first and second rotary positions wherein the charge air passage and the bypass passage are each partially open, allowing varying degrees of charge and bypass airflow through the housing depending upon the angular intermediate position of the rotary body.

2. An engine as in claim 1 wherein the rotary body and the mating recess of the housing are generally cylindrical and the valve approximates the form of a barrel valve.

3. An engine as in claim 2 wherein the charge air passage of the rotary body is formed as a slot with a generally flat bottom.

4. An engine as in claim 2 wherein the bypass passage of the rotary body forms an enclosed curve in the side of the rotary body opposite said one side.

5. An engine as in claim 2 wherein the throttle air outlet of the throttle valve is connected with a charge air inlet of the supercharger.

6. An engine as in claim 5 wherein the bypass air inlet of the throttle valve is connected with the charge air inlet of the engine.

7. An engine as in claim 1 including an EGR valve connected between the engine exhaust outlet and the supercharger air inlet, downstream of the charge air valve.

8. A dual rotary throttle valve comprising:
A housing having a generally circular recess therein a primary air inlet and an air outlet extending laterally aligned through the housing on one side of the recess and a secondary air inlet extending through the housing on an opposite side of the recess from said one side;

a combined charge air and bypass throttle control valve comprising a rotary body throttle valve including a rotary valve element received in the housing recess, the rotary body having a charge air passage extending through one side of the body and aligned with the housing throttle air inlet and throttle air outlet in a first rotary position of the body, allowing open passage of charge air through the housing air inlet and outlet; and the rotary body having a bypass passage through said side opposite said one side, the bypass passage communicating the bypass air inlet with the throttle air outlet in a second rotary position of the rotary body in the valve housing wherein the charge air passage is blocked and the bypass passage is fully open;

the rotary body having intermediate positions between the first and second rotary positions wherein the charge air passage and the bypass passage are each partially open, allowing varying degrees of charge and bypass airflow through the housing depending upon the angular intermediate position of the rotary body.

9. A dual rotary throttle valve as in claim 8 wherein the rotary body and the mating recess of the housing are generally cylindrical and the valve approximates the form of a barrel valve.

10. A dual rotary throttle valve as in claim 8 wherein the charge air passage of the rotary body is formed as a slot with a generally flat bottom.

11. A dual rotary throttle valve as in claim 10 wherein the bypass passage of the rotary body forms an enclosed curve in the side of the rotary body opposite said one side.

12. A method of controlling charge air and bypass airflow into an air inlet of a positive displacement supercharger of an internal combustion engine, the method comprising:

providing a combined charge air and bypass air control valve upstream of the supercharger intake and comprising a rotary body throttle valve having a primary air passage and a separate bypass air passage each extending through the rotary body, the passages being positioned such that the primary air passage is fully open in a first rotary position of the rotary body wherein the bypass air passage is closed, and the bypass air passage is fully open in a second rotary position of the rotary body wherein the primary air passage is closed and the airflow through passages varies in an inverse manner as the rotary body is rotated through intermediate positions between the first and second positions; and controlling the position of the rotary body with a single actuator movable through the full range of positions whereby rates of air flow through the primary and bypass airflow passages are inversely varied in a predetermined and simplified manner.

* * * * *